United States Patent [19]

Robbins et al.

[11] 3,887,431

[45] June 3, 1975

[54] YEAST PROTEIN ISOLATE WITH REDUCED NUCLEIC ACID CONTENT AND PROCESS OF MAKING SAME

[75] Inventors: Ernest Aleck Robbins, High Ridge; Robert William Sucher; Erich Henry Schuldt, Jr., both of St. Louis County; Daniel Robert Sidoti, Ballwin; Robert Dudley Seeley, Crestwood; Jon Albert Newell, Webster Groves, all of Mo.

[73] Assignee: Anheuser-Busch Incorporated, St. Louis, Mo.

[22] Filed: Nov. 29, 1972

[21] Appl. No.: 310,469

[52] U.S. Cl. .................... 195/5; 260/112 R; 426/60; 426/148; 426/204; 426/364
[51] Int. Cl. ............................................. A23j 1/18
[58] Field of Search ............. 426/60, 148, 364, 204, 426/212, 279; 260/112 R; 195/5

[56] References Cited
UNITED STATES PATENTS

| | | |
|---|---|---|
| 3,268,412 | 8/1966 | Champagnat et al. ................... 195/3 |
| 3,585,179 | 6/1971 | Samejima et al. ................... 260/112 |
| 3,615,654 | 10/1971 | Ayukawa et al. .......................... 99/9 |
| 3,634,194 | 1/1972 | Frankenfeld et al. ................... 195/28 |
| 3,681,195 | 8/1972 | Suekane et al. .......................... 195/4 |
| 3,718,541 | 2/1973 | Kalina ..................................... 195/28 |
| 3,725,075 | 4/1973 | Muroi et al. .............................. 99/14 |

*Primary Examiner*—James R. Hoffman
*Attorney, Agent, or Firm*—Gravely, Lieder & Woodruff

[57] ABSTRACT

This disclosure relates to a yeast protein isolate (IYP) with less than 9% nucleic acid (RNA) and a Protein Equivalence Ratio (PER) of greater than 1. The yeast protein is made by a process which involves rupturing yeast cells, removing the cell wall residue from an alkaline medium, incubating in such a manner that the endogenous nuclease contained in the solubles portion degrades the nucleic acid present to a soluble form, insolubilizing the protein to separate it from the hydrolyzed nucleic acid, and separating the insoluble protein from the fraction containing soluble nucleic acid.

The composition of the yeast protein isolate is 65–85% protein; 0.5–9% nucleic acid (preferably less than 5% and ideally less than 3% RNA); 7–15% lipid; 1–5% ash; and 5–20% carbohydrate.

25 Claims, 1 Drawing Figure

YEAST PROTEIN ISOLATE WITH REDUCED NUCLEIC ACID CONTENT AND PROCESS OF MAKING SAME

BACKGROUND OF THE INVENTION

There has been considerable information published on the production of microbial protein. The term "microbial protein" has developed two meanings. One meaning connotes the whole cell, in which the protein is contained within the confines of the cell wall and therefore is relatively non-functional. The other meaning connotes a protein isolated as a separate entity from the microbe. In either case, for human nutrition, the nucleic acid content of the protein product should be reduced to a lower level, namely below about 9% by weight, if yeast protein is a substantial source of protein in a human diet. The Recommended Daily Allowance of the Food and Nutrition Board, National Research Council for protein is 65 grams per day for a 70 Kilogram adult male and and The Protein Advisory Group of the United Nations System recommends that the amount of nucleic acid ingested per day from microbial protein should be less than two grams. Therefore, the nucleic acid content of the protein should be less than three percent if these criteria are to be met when yeast protein is the only source of dietary protein.

The nucleic acid content of yeast cells such as *Candida utilis* and *Saccharomyces cerevesiae* is about 12 to 15 grams of nucleic acid per 100 grams of crude protein. Crude protein is calculated in this application as the Nitrogen (N) content multiplied by 6.25. The protein isolated from these cells also contain 12 to 15 grams nucleic acid per 100 grams of crude protein. Thus, the nucleic acid content must be reduced several fold before a substantial amount of the protein is used for human nutrition. The nucleic acid of yeast is mainly ribonucleic acid or RNA, and in this application these terms will be used interchangeably.

The reduction of the nucleic acid content can be accomplished by the hydrolysis of the nucleic acid within the cell to fragments of such size that the fragments can be diffused from the cell away from the protein. It is known that the enzyme, nuclease, is present in certain yeast cells and that nuclease hydrolyzes or breaks up nucleic acid molecules to smaller fragments. It also is known in the art that the hydrolysis of nucleic acids within the cell can be accomplished by a multi-step heating process to activate the self-contained or endogenous nuclease to produce cells containing two to three grams of nucleic acid per 100 grams of protein. Nucleic acid also can be hydrolyzed by exposing the cell to an external nuclease.

In either of these procedures, two fractions are obtained. One fraction is the cell containing a reduced content of nucleic acid. The other fraction is the surrounding medium containing nucleic acid fragments and other diffusable material. One disadvantage of these processes is that the protein remains within the cell in a non-functional form for food use. Another disadvantage is that the processes by which the cell wall is made permeable to the nucleic acid fragments also severely decrease the ability of the cell to be ruptured to allow the protein to be harvested. A further disadvantage is the difficulty in controlling the endogenous protease which hydrolyzes the protein, thereby complicating protein recovery.

When yeast cells are ruptured by any method, a cellular debris fraction and a soluble cytoplasmic constituent fraction are obtained. These fractions can be separated by centrifugation or filtration. Among the soluble cytoplasmic constituents are the nucleic acid and the protein, either individually or in conjugation. In any situation, recovery of the protein by isoelectric precipitation results in a protein product with an undesirable content of nucleic acid.

Chargaff, in Vol. I, *The Nucleic Acids*, states that ribonucleic acid can be hydrolyzed by the action of 1 N HCl for one hour at 100°C., or by the action of 0.1 N NaOH at 100°C. The application of such acidic or alkaline conditions to the microbial cytoplasmic constituents resulting from yeast cell rupture results in the hydrolysis of the nucleic acid. However, these conditions or even less drastic conditions result in a decrease in protein recovery, the development of undesirable flavors, and a decrease in nutritional value of the protein.

Hydrolysis of the nucleic acids by enzymatic methods allows the use of much milder conditions than those necessary for the chemical methods of hydrolysis. As previously mentioned, the enzyme, nuclease, is known to hydrolyze nucleic acids. Several sources of nuclease have been described in the literature. However, the nuclease preparations must meet certain criteria, namely, the preparation must be free of secondary enzyme systems (such as protease, which would cause a decrease in protein recovery), and the preparation must not contribute an undesirable flavor to the products. Furthermore, to be of commerical interest, the nuclease preparation must be readily available at a reasonable cost and the nuclease must be of food grade acceptability. None of the known nuclease preparations meet these critera.

Thus, it is a principal object of this invention to provide a yeast protein relatively free of nucleic acid, but still having good nutritional value and of acceptable eating quality.

Another principal object is to provide a process of making a yeast protein isolate in which endogenous nuclease is used to hydrolyze the nucleic acid so that the nucleic acid fragments can be separated from the protein by precipitation of the protein.

These and other objects and advantages will become apparent hereinafter.

SUMMARY OF THE INVENTION

Figure 1:
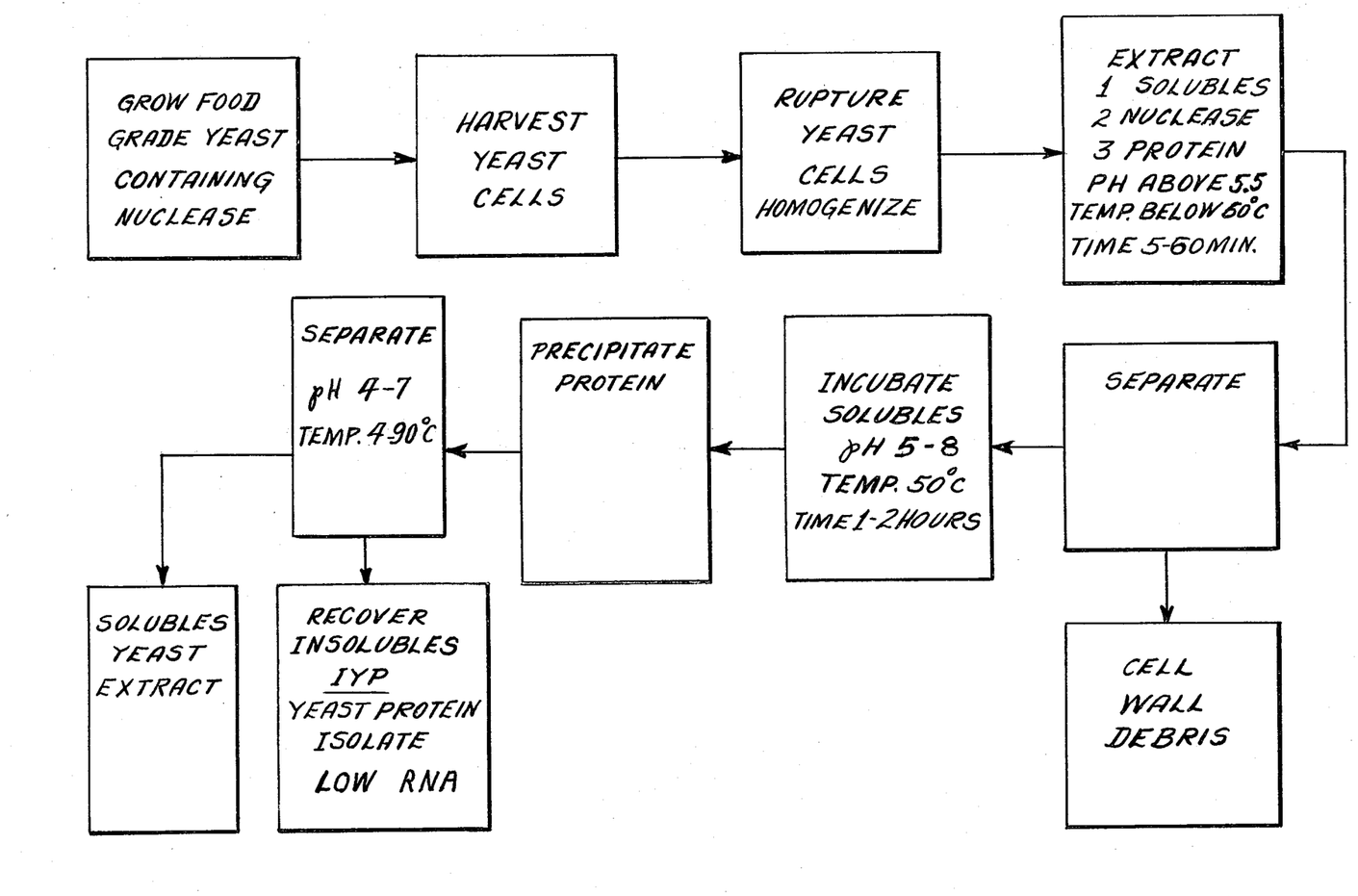

This invention comprises a yeast protein isolate having less than about 90% nucleic acid and preferably below 3% nucleic acid. This invention also comprise a method of making yeast protein of low nucleic acid content and free of cell wall debris by the use of endogenous nuclease to solubilize the nucleic acid. The drawing is a block diagram of the process of this invention.

DETAILED DESCRIPTION

We have developed a process to selectively extract, activate and utilize the endogenous nuclease present in microbial cells. We have discovered that the extraction of a homogenate of yeast cells at an acid, neutral, or alkaline pH causes the nuclease to be present in the soluble cytoplasmic materials, but that certain conditions of pH, time, and temperature are optimal to produce and recover a protein product having a low content of nucleic acid in an acceptable yield (as more fully set forth in the Examples).

Several advantages of this novel process are readily apparent. One advantage is that the nucleic acid content of the isolated protein is dramatically reduced. Another advantage of the selective utilization of the endogenous nuclease is that the amount of corrected protein recovered is not reduced by the process. A third advantage is that the mild conditions obviate the need for acid or alkali resistant equipment. A further advantage of the mild conditions is the lack of destruction of protein nutritional quality.

In practice, yeast cells are produced by methods known to those versed in the art. The microbial biomass is harvested by centrifugation or filtration. In this application the term "biomass" means living yeast cells. The only restriction on the production of the yeast or on the starting yeast material is that it must contain sufficient nuclease to reduce the nucleic acid in later stages of the process. The biomass is water washed, and dilute alkali may be incorporated in the wash to remove adhering color and taste bodies. The microbial cells are ruptured by any of several known methods, such as high pressure homogenization, attrition in a sand or colloid mill, sonic disintegration, repeated freeze-thaw cycles, lytic enzymes, and the like. The most important factor is to rupture a majority of the cells under conditions such that (1) the endogenous nuclease is not destroyed, (2) the protein can be harvested, and (3) no off flavors are introduced. The presently preferred method is homogenization under the following conditions: pressure 5000 to 15000 psig.; 1 to 5 passes through the homogenizer; temperature 32° F. to 122°F. pH 4.5–6.5. The ruptured yeast cell system (homogenate) may be diluted, warmed, and pH adjusted to favor processability and nuclease and protein extractability; again, keeping in mind the foregoing considerations.

While the endogenous nuclease reaction can be applied at this stage, a consequence of the endogenous nuclease reaction is the insolubilization of most of the protein. Consequently, if the endogenous nuclease is applied to the homogenate, then the harvested protein would be contaminated by the cell wall residue, thereby diluting the protein, and also preventing the harvesting of the valuable cell wall residue.

Therefore, in our process the homogenate is adjusted to a pH of above 5.5 preferably between 8 and 11 for 5 to 60 minutes and at a temperature of 40°F. to 140°F. This extracts the nuclease, protein, and other alkali soluble materials. The homogenate then is separated by centrifugation and/or filtration into a cell wall residue and an extract, usually referred to as the alkaline extract. The development of a yeast glycan from the cell wall residue is described in our copending patent application entitled Yeast Glycan and Process of Making Same Ser. No. 310,452, filed Nov. 29, 1972.

If the protein is recovered by isoelectric precipitation at this stage, the protein will then contain undesirable levels of nucleic acid. Such preparations are hereinafter called full ribonucleic acid-isolated yeast protein or full RNA–IYP. However, as will be explained in more detail hereinafter, if the endogenous nuclease reaction is applied in accordance with our procedure, the protein can be harvested with or without pH adjustment by simple centrifugation or filtration, and the recovered protein has a desirably low level of nucleic acid. Hereinafter such protein is called low ribonucleic acid-isolated yeast protein or low RNA-IYP. The mild conditions employed in our process do not introduce off-flavors in, or destroy nutritive quality of the protein.

The incubation of the endogenous nuclease is done at 40° to 60°C., a pH of 5 to 8, and for a time of 15 to 120 minutes. The protein is separated by centrifugation. Preferably, 0.1 to 1.0% by weight of solids of $CaCl_2$ is added to expedite recovery of the protein. The recovery conditions are a pH of 4 to 7 and a temperature of 4° to 90°C.

The nuclease reaction mixture is separated into a low RNA-protein sludge fraction and a soluble cytoplasmic constituents fraction. The soluble cytoplasmic constituents fraction contains the nucleic acid fragments, some protein and protein fragments, glycogen, and all of the metabolic intermediates including the vitamins. The soluble cytoplasmic constituents constitute a valuable fraction of the total microbial system and are known by us as yeast extract or acid whey.

The harvested low RNA-IYP fraction may be water washed to remove adhering cytoplasmic materials. In practice, the low RNA-IYP is usually concentrated in vacuo to provide economy of drying to a powder by spray drying, drum drying, freeze drying, and the like. An added benefit of the vacuum concentration is the removal of any trace yeasty flavor and odor to produce a bland protein. The conditions of in vacuo concentration are as follows:

Time: 10 min. to 60 min.  Vacuum: 20 to 28 inches Hg
Temp: 120°F. to 200°F.  Concentration Factor: 5% to 25% solids Factors that affect the extraction and utilization of the endogenous nuclease are: nuclease content, pH, processing temperature, reaction time, substrate concentration, activators, and inhibitors. These factors can interact to affect the protein composition and yield. The tables and discussion which follow will described the interaction of those factors which are most important in obtaining a desired product.

The product of this invention is a substantially cell free protein isolate and contains the following composition by weight on a dry solids basis:
   About 65–85% protein
   About 0.5–9.0% nucleic acid (preferably less than about 3%)
   About 7–15% lipid
   About 1–5% ash
   About 5–20% carbohydrate
   About 0.1 to 2.0% fiber
   About 0.05% to 0.2% calcium ion Extraction at a pH greater than four extracts nuclease into the soluble fraction. However, an extraction at a pH greater than about 5.5 is required to subsequently produce a satisfactory yield. Furthermore, homogenates of yeasts of lesser nuclease content require extraction at greater than neutrality to cause sufficient nuclease to be present to reduce the nucleic acid content to the desired level. As the pH is increased above neutrality more alkali is used to cause the increase, which increases the cost, increases the salt content of subsequent products, increases the development of off-flavors, and possibly reduces the protein quality. Extraction at pH 9.5 is preferred because this is the lowest pH at which the subsequent nuclease reaction results in the desired product. Furthermore, the nuclease is inactive at pH 9.5, which means that nuclease is carried along in the process to the point at which its activity is desired. The pH is then lowered to its active range. While some extraction ocurrs at pH as low as 4.0, in order to obtain the best product a pH of 7 or more is preferred. It is possible to select yeast with greater nuclease activity and use a less than optimum extraction conditions and still obtain a sufficient nuclease to produce a satisfactory product. In this situation a pH of less than 7.0 could be useful.

Considerable latitude is allowed in extraction temperature. Temperatures greater than 50°C. rapidly inactivate the nuclease activity at pH 9.5, but holding for five minutes at 50°C. can be tolerated, and results in a greater yield of protein and a better separation of cell walls from the alkalin extract. The five minute warming period is practical on a large scale. A temperature of 25°C. is advisable if the time and higher temperature cannot be tightly controlled. A temperature slightly above freezing is also practical to help control bacterial contamination if the process rate is slow. A temperature of 60°C. is to be avoided, but at less than 60°C. sufficient nuclease is present to reduce the nucleic acid content even though not to the optimum level. Yeasts with greater nuclease content can withstand higher extraction temperatures.

The parameters affecting nuclease activity per se are sharply defined. Incubation at pH 6 causes the greatest nuclease activity as evidenced by the lowest content of RNA in the IYP. The increase or decrease of even one pH unit markedly increases the RNA content of the IYP. A pH between about 5 and about 7 is workable. Greater nuclease activity in the yeast selected would increase the pH range. At values less than pH 5, isoelectric precipitation of the nucleoprotein occurs which is undesirable until the nucleic acid has all been hydrolyzed. The optimum temperature of an enzyme reaction is that temperature at which the proper balance of activation and inactivation is achieved. The nuclease is more active at 60°C. than at 50°C., but inactivation is also greater, with the end result being an increased level of RNA in the IYP with the 60°C. incubation temperature. Temperatures lower than 50°C. cause a slower rate of reaction. Greater nuclease activity in the yeast broadens the temperature range. The length of incubation (time) is adjusted to attain the desried level of RNA in the IYP. The incubation time is limited by the fact that the 50°C., pH 6 conditions are compatible with bacterial growth. Therefore, the shorter the incubation time, the greater the control of bacterial contamination. Maximization of nuclease activity is a benefit to economy of processing and to control the bacterial contamination.

Removal of the sludge at 70°C., improves the yield, if the optimum conditions of nuclease extraction and utilization were used. An additional benefit of the 70°C. temperature would be derived as a "pasteurization" step.

As previously mentioned, as the nuclease content of the cells is increased by genetic or environmental manipulation, a wider latitude in operating conditions can be tolerated. Also, the greater the RNA content in the finished yeast protein, the greater is the toleration in the operating parameters.

In the following tables, the same general process was followed. A suspension of washed baker's yeast (12% solids) was homogenized by means of a Manton-Gaulin homogenizer. The homogenate was diluted to 4% solids, adjusted to various pH values and incubated at the noted temperatures for the noted times. The cell wall residue was removed by centrifugation. The extract was incubated under the noted conditions, followed by adjustment to pH 4.5 to precipitate the protein. The protein was harvested by centrifugation, washed and analyzed.

In the tables, the homogenate is the product of the homogenization of the yeast cells, while the extract is the liquid fraction resulting from the separation of the cell wall residue. The IYP or yeast protein isolate is the solids fraction recovered from centrifugation of the alkali extract after incubation, adjustment to pH 4.5, and washing.

The RNA is determined by the following method:

RNA determination: About 50 mg. IYP is digested with 5 ml. of 0.2N KOH for 30 minutes at 100°C. The digest is acidified with 5 ml. $HClO_4$ citrate reagent (0.4M citrate buffer, pH 2.2 containing 1.7 ml., 70% $HClO_4$ per 100 ml.). The residue is removed by centrifugation. The $A_{260}$ of the suitably diluted supernatant is measured. The extinction coefficient of 31.7 $A_{260}$ ml/mg. is used to calculate RNA. The RNA content is corrected for the $A_{260}$ contribution of protein fragments in the hydrolysate as measured by the Lowry method.

The Crude Protein is calcuated from the Kjeldahl Nitrogen method, considering that the crude protein contains 16.0% nitrogen. The Total Nitrogen of the IYP is measured and multiplied by a factor of 6.25. The nucleic acid is considered to contain 16.3% nitrogen. Therefore, the RNA content divided by 6.13 give the nitrogen content of the nucleic acid.

As an example, where RNA is measured to be 8.5 and Total Nitrogen is 13.92, then the calculations are made as follows:

$$\text{Crude Protein} = 13.92 \times 6.25 = 87.0$$
$$\text{RNA Nitrogen} = \frac{\text{RNA}}{6.13} = \frac{8.5}{6.13} = 1.36$$
$$\text{Corrected Protein} = 6.25 \times (13.92 - 1.36) = 78.4\%$$

The yield of Corrected Protein is calculated on the basis of the 100 grams of Corrected Protein in the starting yeast. The Corrected Protein in the starting yeast is measured in the same manner as the Corrected Protein in the IYP hereinbefore described. The yield of Corrected Protein is measured as the amount of IYP harvested × the Corrected Protein content of the IYP. Therefore:

Yield of Corrected Protein =

$$\frac{\text{Weight of Corrected Protein of IYP} \times 100}{\text{Weight of Corrected Protein of starting yeast}}$$

It may be noted that the baker's yeast used in Tables I–VI averaged 53.5 g. Crude Protein, 45.9 g. Corrected Protein, and 7.5 g. RNA per 100 grams of solids. The Protein Yield is a product of extractability and precipitability. In all cases noted in these Tables, the protein extractability was 90–95%.

TABLE NO. I

| Run No. | Extraction Conditions Applied to Homogenate | | | Incubation Conditions of Extract | | | IYP Composition (dsb) | | | % Yield of Corrected Protein |
|---|---|---|---|---|---|---|---|---|---|---|
| | pH | Temp. °C. | Time (min) | pH | Temp. °C. | Time (min) | %RNA | % Protein Crude | Corrected | |
| 1 | 7 | 25 | 30 | 6 | 50 | 90 | 8.5 | 87.0 | 78.4 | 56 |
| 2 | 8 | 25 | 30 | 6 | 50 | 90 | 2.8 | 80.5 | 77.7 | 61 |
| 3 | 9 | 25 | 30 | 6 | 50 | 90 | 2.7 | 84.2 | 81.5 | 58 |
| 4 | 9.5 | 25 | 30 | 6 | 50 | 90 | 2.0 | 81.1 | 79.1 | 60 |
| 5 | 9.5 | 25 | 30 | — | — | — | 13.7 | 90.3 | 76.3 | 62 |
| 6 | 10 | 25 | 30 | 6 | 50 | 90 | 2.0 | 84.4 | 82.4 | 60 |
| 7 | 11 | 25 | 30 | 6 | 50 | 90 | 1.6 | 87.5 | 85.9 | 58 |

Table No. I shows that the pH of the homogenate should be greater than pH 7 during the extraction for sufficient nuclease to be extracted and/or activated to hydrolyze the RNA during the subsequent incubation of the extract.

Table No. I also shows that the extract must be incubated. Run No. 5 was not incubated and the IYP had an RNA of 13.7, whereas Run No. 4, which was extracted at identical conditions but was incubated, showed an RNA of only 2.0 in the IYP.

Table No. II shows that the incubation pH of the extract should be between about pH 5 and about pH 7 for optimum hydrolysis of the RNA by the nuclease.

TABLE NO. III

| Run No. | Extraction Conditions Applied to Homogenate | | | Incubation Conditions of Extract | | | IYP Composition (dsb) | | | % Yield of Corrected Protein |
|---|---|---|---|---|---|---|---|---|---|---|
| | pH | Temp. °C. | Time (min) | pH | Temp. °C. | Time (min) | %RNA | % Protein Crude | Corrected | |
| 1 | 9.5 | 25 | 30 | 7 | 50 | 30 | 6.3 | 83 | 76.6 | 57 |
| 2 | 9.5 | 25 | 30 | 7 | 50 | 60 | 4.4 | 85 | 80.5 | 60 |
| 3 | 9.5 | 25 | 30 | 7 | 50 | 120 | 2.8 | 87 | 84.1 | 59 |
| 4 | 9.5 | 25 | 30 | 7 | 60 | 30 | 3.4 | 84 | 80.5 | 63 |
| 5 | 9.5 | 25 | 30 | 7 | 60 | 60 | 3.7 | 88 | 84.2 | 63 |
| 6 | 9.5 | 25 | 30 | 7 | 60 | 120 | 3.4 | 82 | 78.5 | 63 |

Table Nos. IV and IVA show that the extraction temperature can be raised and the time shortened and still obtain good results as far as RNA removal is concerned. The optimum temperature is about 50°C. and the time is about 5 minutes. Table No. IV also shows that the optimum incubation conditions are 50°C. for 120 minutes.

TABLE NO. II

| Run No. | Extraction Conditions Applied to Homogenate | | | Incubation Conditions of Extract | | | IYP Composition (dsb) | | | % Yield of Corrected Protein |
|---|---|---|---|---|---|---|---|---|---|---|
| | pH | Temp. °C. | Time (min) | pH | Temp. °C. | Time (min) | %RNA | % Protein Crude | Corrected | |
| 1 | 9.5 | 25 | 30 | 9 | 50 | 120 | 14.9 | 85 | 69.8 | 59 |
| 2 | 9.5 | 25 | 30 | 8 | 50 | 120 | 7.5 | 84 | 76.3 | 58 |
| 3 | 9.5 | 25 | 30 | 7 | 50 | 120 | 2.4 | 82 | 79.5 | 58 |
| 4 | 9.5 | 25 | 30 | 6 | 50 | 120 | 1.8 | 80 | 78.2 | 56 |
| 5 | 9.5 | 25 | 30 | 5 | 50 | 120 | 3.7 | 80 | 76.2 | 48 |
| 6 | 9.5 | 25 | 30 | 4 | 50 | 120 | 10.8 | 84 | 73.0 | 50 |

TABLE NO. IV

| Run No. | Extraction Conditions Applied to Homogenate | | | Incubation Conditions of Extract | | | IYP Composition (dsb) | | | % Yield of Corrected Protein |
|---|---|---|---|---|---|---|---|---|---|---|
| | pH | Temp. °C. | Time (min) | pH | Temp. °C. | Time (min) | %RNA | % Protein Crude | Corrected | |
| 1 | 9.5 | 50 | 5 | 7 | 50 | 120 | 2.2 | 81 | 78.8 | 63 |
| 2 | 9.5 | 50 | 20 | 7 | 50 | 120 | 4.1 | 81 | 76.8 | 64 |
| 3 | 9.5 | 50 | 30 | 7 | 50 | 120 | 5.3 | 81 | 75.6 | 68 |
| 4 | 9.5 | 50 | 60 | 7 | 50 | 120 | 7.6 | 84 | 76.2 | 66 |
| 5 | 9.5 | 60 | 5 | 7 | 50 | 120 | 11.3 | 91 | 79.5 | 67 |
| 6 | 9.5 | 60 | 20 | 7 | 50 | 120 | 11.3 | 85 | 73.5 | 68 |
| 7 | 9.5 | 60 | 30 | — | — | — | 11.9 | 84 | 72.1 | 71 |

TABLE NO. IVA

| Run No. | Extraction Conditions Applied to Homogenate | | | Incubation Conditions of Extract | | | IYP Composition (dsb) | | | % Yield of Corrected Protein |
|---|---|---|---|---|---|---|---|---|---|---|
| | pH | Temp. °C. | Time (min.) | pH | Temp. °C. | Time (min.) | % RNA | % Protein Crude | Corrected | |
| 1 | 9.5 | 25 | 30 | 6.0 | 50 | 30 | 6.2 | 83.3 | 77.1 | 55 |
| 2 | 9.5 | 25 | 30 | 6.0 | 50 | 60 | 2.9 | 81.4 | 78.4 | 55 |
| 3 | 9.5 | 25 | 30 | 6.0 | 50 | 90 | 2.3 | 79.9 | 77.5 | 55 |

TABLE NO. IVA —Continued

| Run No. | Extraction Conditions Applied to Homogenate | | | Incubation Conditions of Extract | | | IYP Composition (dsb) | | | % Yield of Corrected Protein |
|---|---|---|---|---|---|---|---|---|---|---|
| | pH | Temp. °C. | Time (min.) | pH | Temp. °C. | Time (min.) | % RNA | % Protein Crude | Corrected | |
| 4 | 9.5 | 25 | 30 | 6.0 | 50 | 120 | 1.9 | 81.5 | 79.6 | 56 |
| 5 | 9.5 | 25 | 30 | 6.0 | 60 | 30 | 4.0 | 79.0 | 75.0 | 58 |
| 6 | 9.5 | 25 | 30 | 6.0 | 60 | 60 | 3.8 | 82.6 | 78.7 | 58 |
| 7 | 9.5 | 25 | 30 | 6.0 | 60 | 90 | 3.9 | 79.1 | 75.1 | 56 |
| 8 | 9.5 | 25 | 30 | 6.0 | 60 | 120 | 3.6 | 79.0 | 75.4 | 55 |
| 9 | 9.5 | 25 | 30 | 6.0 | 70 | 30 | 9.7 | 82.5 | 72.6 | 59 |
| 10 | 9.5 | 25 | 30 | 6.0 | 70 | 60 | 9.6 | 83.5 | 73.7 | 58 |
| 11 | 9.5 | 25 | 30 | 6.0 | 70 | 90 | 9.7 | 81.9 | 72.0 | 59 |
| 12 | 9.5 | 25 | 30 | 6.0 | 70 | 120 | 9.9 | 81.5 | 71.4 | 60 |
| 13 | 9.5 | 25 | 30 | — | — | — | 17.8 | 86.8 | 68.7 | 54 |

Table No. IV shows that extraction temperatures of 50°C. result in greater RNA removal than extraction temperatures of 60°C. even at longer extraction times. There is little difference between Runs 6 and 7 in RNA removal even though in Run No. 7, the extract was not incubated. This indicates the nuclease was not extracted in a useful state at the conditions of Run No. 6. Even at 50°C. extraction, shorter extraction times result in greater RNA removal.

TABLE NO. V

| Run No. | Extraction Conditions Applied to Homogenate | | | Incubation Conditions of Extract | | | IYP Composition (dsb) | | | % Yield of Corrected Protein |
|---|---|---|---|---|---|---|---|---|---|---|
| | pH | Temp. °C. | Time (min) | pH | Temp. °C. | Time (min) | %RNA | Crude | Corrected | |
| 1 | 7 | 25 | 30 | 7 | 50 | 0 | 8.2 | 92 | 83.6 | 60.5 |
| 2 | 7 | 25 | 30 | 7 | 50 | 120 | 9.7 | 92 | 82.1 | 58.5 |
| 3 | 7 | 25 | 30 | 7 | 50 | 240 | 7.7 | 81 | 73.1 | 59.5 |
| 4 | 7 | 25 | 30 | 7 | 60 | 20 | 9.3 | 87 | 77.5 | 60.5 |

Table No. V shows that increasing the incubation time reduces RNA slightly at pH 7 and 50°C. even if the extraction pH was 7.0 instead of the preferred alkaline range.

The Tables I–V show that the optimum extraction conditions are pH 9.5, temperature 50°C., and time 5 minutes. The optimum incubation conditions are pH 6, temperature 50°C., and time 60–120 minutes.

The following Table, Table No. VI compares the extraction and harvest conditions upon protein yield. All figures were calculated as hereinbefore described.

TABLE NO. VI
Interaction of Extraction and Harvest Conditions Upon Protein Yields A suspenison of washed baker's yeast at 12% solids was homogenized by means of a Manton-Gaulin homogenizer. The homogenate was diluted to 4% solids and adjusted to pH 9.5. Part of diluted homogenate was incubated at 25°C. for 5 minutes, and another part was incubated at 50°C. for 5 minutes before centrifuging to remove the cell wall residue. The extracts were adjusted to pH 6 and incubated at 50°C. for 90 minutes. At this time part of the extract was cooled to 25°C., and centrifuged. Another part of the extract was warmed rapidly to 70°C. and centrifuged. The IYP's were recovered and analyzed.

TABLE NO. VI

| Run No. | Extraction | | Nuclease Treatment | | | Harvest | | IYP Composition (dsb) | | | Yield Corrected Protein |
|---|---|---|---|---|---|---|---|---|---|---|---|
| | pH | Temp. °C. | pH | Temp. °C. | Time (min) | pH | Temp. °C. | %RNA | Crude | % Protein Corrected | |
| 1 | 9.5 | 50 | 6 | 50 | 90 | 6 | 70 | 1.1 | 82.2 | 81.1 | 65.4 |
| 2 | 9.5 | 50 | 6 | 50 | 90 | 6 | 25 | 1.4 | 82.1 | 80.7 | 61.5 |
| 3 | 9.5 | 25 | 6 | 50 | 90 | 6 | 70 | 1.6 | 83.5 | 80.9 | 48.7 |
| 4 | 9.5 | 25 | 6 | 50 | 90 | 6 | 25 | 1.7 | 81.3 | 79.6 | 50.6 |

Table No. VI shows that the optimum protein harvest conditions are pH 6 at 70°C.

As the nuclease content of the yeast cells is increased by genetic or environmental manipulation, a wider latitude in operation conditions would be possible. Table NO. VI shows that the optimum protein harvest conditions are pH 6 and 70°C. Such a wider latitude is exemplified by the data of Table VII which were obtained with a yeast containing more nuclease than the yeast used to generate the data of Tables I–VI. The data of Table VII shows that the extraction at pH 7 can cause the presence of sufficient nuclease to produce a reduced content of nucleic acid in the isolated protein. Furthermore, the homogenate can be extracted as low as pH 4 and still cause the presence of sufficient nuclease to reduce the nucleic acid content of the isolated protein. However, yield considerations become paramount. Extraction below pH 6 results in less protein being solubilized (lower % extractability) and less protein being precipitated (% precipitation), so that the overall yield is reduced to a non-economic level.

Although the data of Tables I–VII were obtained with baker's yeast, our process is not limited to baker's yeast. As shown in Table VIII the endogenous nuclease process is applicable to various species of yeast.

TABLE VII

| Run No. | Extraction pH | Extraction Temp. °C. | Nuclease Treatment pH | Nuclease Treatment Temp. | Time min. | %RNA | IYP Composition (dsb) % Protein Crude | IYP Composition (dsb) % Protein Corrected | Yield of Corrected Protein Extraction | Yield of Corrected Protein Precipitation | Yield of Corrected Protein Over all |
|---|---|---|---|---|---|---|---|---|---|---|---|
| 1 | 9.5 | 25 | 6.0 | 50 | 90 | 1.6 | 78.0 | 76.4 | 84 | 60 | 49 |
| 2 | 8.0 | 25 | 6.0 | 50 | 90 | 1.6 | 78.1 | 76.5 | 84 | 56 | 46 |
| 3 | 7.0 | 25 | 6.0 | 50 | 90 | 1.8 | 76.7 | 74.9 | 84 | 56 | 46 |
| 4 | 6.0 | 25 | 6.0 | 50 | 90 | 1.6 | 76.7 | 75.0 | 79 | 46 | 35 |
| 5 | 5.0 | 25 | 6.0 | 50 | 90 | 1.0 | 79.2 | 77.5 | 36 | 24 | 9 |
| 6 | 4.0 | 25 | 6.0 | 50 | 90 | 1.6 | 69.1 | 67.5 | 33 | 17 | 6 |

TABLE NO. VIII

The Nucleic Acid Content of IYP Prepared from Various Yeasts

Yeast biomass was prepared in fermentation by processes knwon to those versed in the art. The yeast biomass was harvested by centrifugation and washed twice with water. The yeast cells were ruptured by means of a Manton-Gaulin homogenizer. Protein and other solubles were extracted from the homogenate by stirring at pH 9.5 and recovered as an alkaline extract by centrifugation. The extraction and centrifugation were conducted at 25°C. A portion of the alkaline extract was immediately adjusted to pH 4.5 to precipitate a full RNA-IYP. Another portion of the alkaline extract was acidified to pH 6, and incubated at 50°C. for two hours. The system was then adjusted to pH 4.5 to provide a low RNA-IYP. The IYP's were water washed and analyzed for RNA content.

The *Saccharomyces carlsbergensis* and the *Saccharomyces elipsoideus* showed substantial reductions of RNA, but not below 5. This means that these strains of yeast would require additional nuclease, either from an outside source or by selective development of strains with more internal nuclease to reduce the RNA to below the preferred level of 3.0. Conditions of growth also may be varied to give more endogenous nuclease in these yeasts.

Furthermore, the low RNA-IYP from the various yeasts is obtained in reasonable yield, and with comparable compositions as shown in following Table No. IX.

TABLE NO. IX

Composition and Yield of Low RNA-IYP Via the Endogenous Process
See Table No. VI for yeast growth and process conditions.

| Source of Yeast | Protein Crude | Protein Corrected | RNA | Lipid | Ash | Carbohydrate | Yield Corrected Protein |
|---|---|---|---|---|---|---|---|
| *Saccharomyces cerevisiae* (Commercial) | 78.0 | 75.9 | 2.1 | 12.7 | 2.3 | 7.0 | 56.5 |
| *Saccharomyces cerevisiae* (Continuous) | 71.5 | 69.9 | 1.6 | 13.8 | 3.8 | 10.9 | 57.0 |
| *Saccharomyces carlsbergensis* | 82.5 | 76.6 | 5.8 | 11.4 | 1.9 | 4.2 | 50.0 |
| *Saccharomyces fragilis* | 72.2 | 70.2 | 2.0 | 14.4 | 2.9 | 11.0 | 36.0 |
| *Candida utilis* Y-900 | 76.9 | 74.8 | 2.1 | 13.1 | 0.6 | 9.0 | 52.0 |
| *Candida utilis* Y-1084 | 78.2 | 76.1 | 2.1 | 10.4 | 0.9 | 10.5 | 56.9 |

Following are detailed Examples of this invention:

EXAMPLE I 1000 grams of commerical baker's yeast cream (*Saccharomyces cerevisiae*) containing 9% solids, pH 5.9, was homogenized by three successive passes through a Manton-Gaulin homogenizer at 8000 PSIG.

| Yeast Source | Growing Conditions | % RNA of the IYP (dsb) No Treatment | % RNA of the IYP (dsb) Endogenous Process |
|---|---|---|---|
| *Saccharomyces cerevisiae* | Commercial production | 12.5 | 2.1 |
| *Saccharomyces cerevisiae* | Continuous fermentation | 12.4 | 1.2 |
| *Saccharomyces carlsbergensis* | Spent yeast recovered from fermented brewer's wort. | 13.7 | 5.8 |
| *Saccharomyces fragilis* | Cheese whey used as carbon source. | 10.2 | 2.0 |
| *Candida utilis* Y-900 | Batch fermentation on molasses. | 11.1 | 2.6 |
| *Saccharomyces carlbergensis* | Batch fermentation on molasses. | 13.4 | 3.6 |
| *Saccharomyces elipsoideus* (Montrechet) | Batch fermentation on molasses. | 13.9 | 3.7 |
| *Saccharomyces elipsoideus* (Steinberg) | Batch fermentation on mollasses. | 13.4 | 8.9 |

The homogenate was diluted with water to 3.4% solids, adjusted to pH 9.5 with 8.5 ml. 10N NaOH, rapidly brought to 50°C., held for five minutes and centrifuged at 13,200 rcf × g. The supernate was adjusted to pH 6 with 15 ml. of 4N HCl, and incubated at 50°C. for 90 minutes. The temperature was then rapidly increased from 50°C. to 70°C. and held at 70°C. for five minutes, followed by centrifugation. 33 g. IYP solids were obtained containing 82.2% crude protein, 81.1% corrected protein and 1.1% RNA (dsb). Considering that the initial baker's yeast cream contained 45.9% corrected protein (dsb), the yield of corrected protein is 65.4%.

EXAMPLE II

Preparation of Yeast Protein from *Saccharomyces fragilis* (*Kluyueromyces fragilis*)

Preparation of Biomass:

A primary growth stage (Stage 1) was prepared as follows. Dry cheddar cheese whey at a concentration of 40 g/l potable water was heated at 121°C. for 5 minutes to produce a proteinaceous coagulum. The coagulum was removed by filtration. Per liter of filtered whey solution the following were added: ammonium sulfate, 5.0 g; dipotassium phosphate 5.0 g; yeast extract powder, 1.0 g. The mixture was adjusted to pH 5.4. One liter volumes of the broth were dispensed in Fernbach flasks fitted with baffles and sterilized in the autoclave. Stage 1 inoculated with 10 ml. of a glucose peptone yeast extract broth culture of *Saccharomyces fragilis* NRRL, Y–1109 per Fernback flash. *Saccharomyces fragilis*, has been recently reclassified to *Kluyueromyces fragilis*. *Stage 1 was incubated for* 3 days by revolving on a rotary shaker at 112 RPM with a 4 inch eccentric throw at 30°C.

Stage 1 yeast equivalent to 5.0 g. dry substance was used to stock Stage 2 in a small fermentor. The stock yeast was added to 3.2 liter of potable water. Immediately a liquid feed stock was supplied to the yeast in the fermentor. The feed stock composition is as follows per liter: rehydrated dry cheddar cheese whey which has been heated and filtered to clarity, equivalent to 150 g. lactose; ammonium sulfate, 36.2 g; 85% phosphoric acid 24.5 ml. The volume is made to 1 liter with potable water. This liquid feed stock was supplied completely and continuously during 11 hours at an increasing hourly rate of 1.14. The yeast growth broth was maintained at pH 5.7. The yeast growth broth temperature was 30°C. Aeration by sparger and impellor was at a rate of 3 volumes air per volume of growth broth per minute.

Stage 2 produced yeast dry substance equivalent to 32% of the lactose supplied. This Stage 2 yeast contained 7.7% N and 1.5% P.

Stage 3 was stocked with 16.4 g. dry substance equivalent of Stage 2 yeast. The stock yeast was added to 3.2 liters of potable water. Stage 3 was carried out in the same manner as Stage 2. Stage 3 produced dry substance yeast equivalent to 37% of the lactose supplied. The Stage 3 yeast contained 7.03% N and 1.52% P.

Preparation of Protein:

The Stage 3 biomass of *Saccharomyces fragilis* was separated from the spent beer by centrifugation and washed two times with water. The biomass was chilled. The cells were ruptured by three successive passes through a Manton-Gaulin homogenizer at 8000–10000 PSIG while maintaining the temperature between 5°C. and 20°C. The homogenate was diluted with an equal volume of water, adjusted to pH 9.4 by the addition of sodium hydroxide, and stirred for 15 minutes at 15°–20°C. The insolubles (yeast glycan) were removed by centrifugation to yield a solution of the soluble cytoplasmic constituents. The soluble fraction is called the alkaline extract. The nitrogen content and volumes of the diluted homogenate and of the alkaline extract were measured. 57% of the nitrogen present in the diluted homogenate appeared in the alkaline extract.

A small portion (100 ml.) of the alkaline extract was immediately adjusted to pH 4.5 to obtain the protein containing the nucleic acid which is referred to as the full RNA–IYP. The RNA content of the full RNA–IYP is reported in Table No. VII.

The major portion of the alkaline extract (610 ml. containing 9.62 g. crude protein) was adjusted to pH 6 with hydrochloric acid and incubated for two hours at 50°C. to allow the endogenous nuclease to digest the nucleic acid. The digest was adjusted to pH 4.5 with hydrochloric acid and centrifuged. The volume and nitrogen content of the supernatant (called acid whey) were measured and 540 ml. of acid whey containing 3.42 grams of crude protein were obtained. By difference, 5.84 grams of crude protein was obtained in the wet residue, which represents a precipitation yield of 63% of the crude protein present in the alkaline extract.

The wet protein residue was washed once with water at pH 4.5 and lyophilized to obtain powder of low RNA–IYP. The analysis of the low RNA–IYP made from *Saccharomyces fragilis* is presented in Table No. IX.

EXAMPLE III

Preparation of Yeast Protein from *Saccharomyces carlsbergensis*

Spent brewers yeast (*Saccharomyces carlsbergensis*) bimoass was obtained from a commerical brewing operation at the St. Louis, Mo. plant of Anheuser-Busch, Incorporated. The biomass was screened twice through a 30 mesh screen to remove non-yeast particles. The biomass was washed three times with about two volumes of water each time to obtain a light cream color to the biomass.

Two liters of a slurry of the biomass was chilled. The cells were ruptured by three successive passes through a Manton-Gaulin homogenizer at 8000–10000 PSIG while maintaining the temperature between 5°C. and 20°C. The homogenate was diluted with a half volume of water, adjusted to pH 9.5 by the addition of sodium hydroxide, and stirred for 15 minutes at 15°–20°C. The insolubles (yeast gum or yeast glycan) were removed by centrifugation to yield a solution of the soluble cytoplasmic constituents. The soluble fraction is called the alkaline extract. The nitrogen content and volume of the diluted homogenate and of the alkaline extract were measured. The alkaline extract contained 80.1% of the nitrogen present in the diluted homogenate.

A portion (900 ml.) of the alkaline extract was immediately adjusted to pH 4.5 to obtain the protein containing the nucleic acid which is referred to as the full RNA–IYP. The RNA content of the full RNA–IYP is reported in Table No. VIII.

Another portion of the alkaline extract (900 ml. containing 11.97 grams of crude protein) was adjusted to pH 6 with hydrochloric acid and incubated for two hours at 50°C. to allow the endogenous nuclease to digest the nucleic acids. The digest was adjusted to pH 4.5 with hydrochloric acid and centrifuged. The volume and the nitrogen content of the supernate (called acid whey) were measured. Eight hundred twenty milliliters of acid whey containing 3.92 grams of crude protein (N × 6.25) were obtained. By difference, 8.05 grams of crude protein was obtained in the wet residue which represents a precipitation yield of 67.1% of the crude protein present in the alkaline extract.

The wet protein residue was washed once with water at pH 4.5 and lyophilized to obtain a powder of low RNA–IYP. The analysis of the low RNA–IYP from *Saccharomyces carlsbergensis* is presented in Table No. IX.

EXAMPLE IV

Preparation of Protein from *Saccharomyces cerevisiae*

Commerical baker's yeast was used as a source of *Saccharomyces cerevisiae*. The biomass was given three water washes and thickened by centrifugation to 11% solids by weight.

Fifty gallons of this suspension containing 45 pounds of yeast solids were cooled to 45°F. and subjected to homogenization at a pressure of 8000 PSIG and immediately cooled to 45°F. The homogenization was repeated for a total of three passes. The homogenate was diluted to a volume of 150 gallons with water, and a food grade alkaline reagent, sodium hydroxide, was added until pH 9.5 was reached. About 1.7 liters of 10 N NaOH were required. The material was agitated for 15 minutes and then centrifuged. The insoluble residue (yeast glycan) was removed. From 43 lbs. of homogenate solids, recovery after homogenization, extraction, and separation yielded 27.5 pounds of alkali extract solids and 16.9 pounds of crude yeast glycan insolubles.

The alkali extract was adjusted to pH 6.0 by the addition of 15 liters of one normal hydrochloric acid, warmed to 122°F. and held with mild agitation for one hour at pH 6.0 to allow the endogenous nuclease to digest the nucleic acid. At the end of the incubation, 37.5 grams of calcium chloride were added. The protein suspension was warmed to 175°F. and centrifuged to yield the protein sludge (14.5 pounds dry solids) and the acid whey (11.5 pounds dry solids). The protein sludge was washed by diluting with two volumes of water, and again centrifuging while the temperature was maintained at 175°F., and the pH was maintained at 6.0. On a dry solids basis, 11.9 pounds of washed protein sludge was obtained, along with three pounds of wash solids.

The washed protein sludge was concentrated in vacuo (28 inches of Hg) at 175°F., pH 6, to 20% solids and spray dried. The composition of the spray dried product was: 3.4% moisture, 73.6% crude protein (N × 6.25), 1.5% nucleic acid, 8.8% lipid, 1.5% ash, 12.7% carbohydrate (by difference).

This Example also demonstrates that calcium chloride increases the rate at which the protein can be recovered by centrifugation. A consequence of the utilization of the endogenous process is the insolubilization of the protein under the incubation conditions of the process, i.e., 50°C., pH 6, 1–2 hours. The protein can be quantitatively recovered by centrifugation, but only at the expense of a reduced rate or throughput. We have found that the addition of calcium chloride after completion of the endogenous nuclease reaction and before the centrifugation, markedly improved the rate of centrifugation or throughput. The effect of adding calcium chloride upon the throughput is shown in Table No. X.

TABLE NO. X

Effect of Calcium Chloride Addition Upon the Rate of Centrifugation of Protein Sludge Yeast protein was prepared through the nuclease reaction stage in accordance with the process as described in Example IV. At the end of the nuclease reaction stage, the system was treated in various ways to attempt to increase the rate of centrifugation of the protein sludge.

| | | TREATMENT OF SYSTEM | | | |
|---|---|---|---|---|---|
| Run No. | pH | Temp. F. | %CaCl$_2$ (1) | % CMC (2) | Rate of Centrifugation Gal/Hr. |
| 120 | 6.0 | 175 | 0 | 0 | 150 |
| 121 | 6.0 | 175 | 0 | 0 | 150 |
| 122 | 6.0 | 175 | 0 | 0 | 200 |
| 124 | 6.0 | 175 | 0.06 | 0 | 175 |
| 125 | 6.0 | 175 | 0.23 | 0 | 275 |
| 128 | 6.0 | 175 | 0.3 | 0 | 300 |
| 129 | 6.0 | 175 | 0.3 | 0 | 285 |
| 127 | 4.5 | 122 | 0 | 1.0 | 175 |

(1) % Calcium chloride = $\dfrac{\text{grams of CaCl}_2}{100 \text{ g. of yeast extract solids}}$ (2) % Carboxymethylcellulose = $\dfrac{\text{grams of CMC}}{100 \text{ g. of yeast extract solids}}$ The addition of calcium chloride to the system did not affect the amount of calcium in the final product as shown in Table XI.

TABLE NO. XI

Composition of Isolated Yeast Protein Prepared in the Presence & Absence of Calcium Chloride Several yeast protein samples were prepared in accordance with the process described in Example IV except that the calcium chloride addition was omitted in some cases. The spray dried samples were analyzed.

| Sample No. | Treatment of System pH | Temp. °F. | %CaCl₂ | Corrected Protein | % Composition (dsb) RNA | Lipid | Ash | Carbo-hydrate | Ca |
| --- | --- | --- | --- | --- | --- | --- | --- | --- | --- |
| 120 | 6.0 | 175 | 0 | 71.1 | 1.4 | 9.7 | 2.4 | 15.4 | 0.101 |
| 121 | 6.0 | 175 | 0 | 75.6 | 1.4 | 10.0 | 2.2 | 10.8 | 0.076 |
| 122 | 6.0 | 175 | 0 | 76.0 | 1.5 | 7.7 | 2.0 | 12.8 | 0.080 |
| 128 | 6.0 | 175 | 0.3 | 74.6 | 1.8 | 13.3 | 2.3 | 8.0 | 0.092 |
| 129 | 6.0 | 175 | 0.3 | 74.7 | 1.6 | 9.0 | 1.6 | 13.1 | 0.091 |
| 133 | 6.0 | 175 | 0.3 | 70.8 | 1.8 | 12.2 | 1.9 | 13.3 | 0.088 |

The advantages of an enzymatic method, particularly the present method which utilizes the endogenous nuclease, are hereinbefore described. One main advantage is the absence of diminution of the protein quality. The nutritional quality of unfractionated yeast and of isolated yeast protein in which the nucleic acid content was reduced by various methods has been measured. The results are presented in Table No. XII. The PER or Protein Equivalence Ratio were measured at WARF Institute, Inc. Madison, Wisconsin. The feeding tests are done on rats and were made using a level of 10% Corrected Protein in the diet and calculated to ANRC casein at PER = 2.5. The actual test procedure is published in Official Methods of Analysis of the A.O.A.C. p. 800, 11th Edition (1970).

In Run Nos. 1 and 3 of Table XII, the yeast was not separated or fractionated and no effort was made to reduce RNA. Run No. 2 was processed according to Example No. IV of this application.

The unfractionated yeasts have high PER but the RNA content is above 7.5% in the whole yeast.

Run No. 4 involved treating an alkaline extract of homogenized yeast with an exogenous nuclease at pH 7; 50°C.; for 2 hours. The nuclease was extracted from malt sprouts and used at the rate of 9 lbs. malt sprout extract solids per 18 lbs. of yeast extract solids. This reduced the nucleic acid content and still maintained a high PER of above 1.0. This method is the subject of a copending application of Newell et al. entitled A Process of Making Yeast Protein Isolate Having Reduced Nucleic Acid Content.

Run No. 5 (LTHA) used a low temperature, high alkali process to reduce RNA. In this process the alkali extract from the homogenate was adjusted to pH 12 with NaOH and heated for 2 hours at 60°C. The protein was isolated after adjustment of the system to pH 4.5. This resulted in reduction of RNA, but also reduced the PER of the protein to below 1.0. This process is also covered in a copending application of Newell et al. entitled The Manufacture of Yeast Protein Isolate Having a Reduced Nucleic Acid Content by an Alkali Process.

Run No. 6 (HTLA) used a high temperature low alkali process to reduce RNA. In this process the alkali extract from the homogenate was adjusted to pH 10.5 and heated for 4 hours at 80°C. The protein was isolated after adjusting the system to pH 4.5. This resulted in reduction of RNA but also resulted in reducing PER value of the protein to below 1.0. This process is covered in a copending application of Newell et al. entitled The Manufacture of Yeast Protein Isolate Having a Reduced Nucleic Acid Content by an Alkali Process.

TABLE NO. XII

Nutritional Quality of Unfractionated Saccharomyces cerevisiae & Candida utilis & of Isolated Yeast Protein Therefrom.

*Candida utilis* strain Y–1084 biomass was prepared by continuous fermentation of a molasses substrate. Biomass of baker's yeast *Saccharomyces cerevisiae* was obtained as commerical baker's yeast. The yeast cell biomass were washed three times with water, spray dried, and analyzed.

Other portions of the biomass were processed in accordance with Example IV to obtain the alkaline extract. The alkaline extracts were treated enzymatically or chemically to subsequently obtain a protein product of low nucleic acid content upon adjusting the pH to 4.5. The protein, which was insolubilized at pH 4.5, was recovered and washed by centrifugation, spray dried, and analyzed.

The spray dried yeast biomass and the protein products derived therefrom were assessed for nutritional quality by the standard PER test.

| Run No. | Material | Nucleic Acid Reduction Step | % dsb Corrected Protein | Nucleic Acid | PER[1] |
| --- | --- | --- | --- | --- | --- |
| 1 | Baker's yeast-unfractionated | None | 46.0 | 7.5 | 1.87, 1.80, 1.70 |
| 2 | Baker's Yeast - IYP | Endogenous Nuclease | 76.4 | 1.2 | 2.10 |
| 3 | *C. utilis* - unfractionated | None | 43.1 | 6.7 | 1.47, 1.70, 1.62, 1.63 |
| 4 | *C. utilis* - IYP | Malt Sprout Nuclease | 67.2 | 1.4 | 1.64 |
| 5 | *C. utilis* - IYP | LTHA | 70.0 | 2.0 | 0.41, 0.51 |
| 6 | *C. utilis* - IYP | HTLA | 71.0 | 2.0 | 0.71 |

[1] adjusted to ANRC casein = 2.5

Isolated yeast protein is esepcially rich in all of the essential amino acids except for the sulfur containing amino acids (Table No. XIII). Except for the sulfur containing amino acids (particularly cystine), the contents of the essential amino acids in isolated yeast protein exceeds that cited by the FAO Committee on Protein Requirements (1957b) "FAO Nutritional Studies No. 16", protein reference pattern, and meets or exceeds that needed by the growing rat.

TABLE NO. XIII

Essential Amino Acid Composition of Isolated Yeast Protein From Baker's Yeast

| | Amino Acid Pattern Required by the Growing Rat [1] | Grams/100 grams Protein | | |
|---|---|---|---|---|
| | | FAO Amino Acid [2] Reference Pattern | IYP [3] | ANRC [4] Casein |
| Lysine | 9.0 | 4.2 | 9.54 | 8.0 |
| Methionine [5] | 1.6 | 2.2 | 1.98 | 2.84 |
| Cystine [5] | 3.4 | 2.0 | 1.30 | 1.02 |
| Threonine | 5.0 | 2.8 | 4.85 | 3.52 |
| Tryptophan | 1.1 | 1.4 | 1.82 | 1.27 |
| Valine | 5.5 | 4.2 | 6.35 | 7.12 |
| Phenylalanine | 4.2 | 2.8 | 6.50 | 5.02 |
| Leucine | 7.0 | 4.8 | 8.44 | 9.65 |
| Isoleucine | 5.5 | 4.2 | 5.44 | 4.85 |
| Tyrosine | 3.0 | | 4.25 | 5.55 |
| Histidine | 2.5 | | 2.96 | 3.2 |

[1] P.B. Rama Rao, H.W. Norton, and B. Connor Johnson, J. Nutrition, 82, p. 88 (1964).
[2] 1957 FAO Amino Acid Reference Pattern.
[3] Isolated Yeast Protein made in accordance with Example IV.
[4] The reference casein used in the PER tests reported in Table No. XII
[5] The Methionine & Cystine were determined by microbiological assay by WARF, Inc. The remaining amino acids were measured using an amino acid analyzer by WARF, Inc.

The Isolated Yeast Protein (IYP) of this invention have the following functional properties; bland flavor, light cream color, easy dispersibility, water absorption, fat adsorption, fiber formation, thermal extrusion, and gel coagulation at pH 3 and pH 6 on heating. Because of these properties, beneficial effects can be attained by the incorporation of our IYP into food products, such as, dairy products, meat products, bakery products and confections. Examples of these applications follow.

The textured IYP referred to in the meat product applications is prepared as follows:

TEXTURED IYP

| Ingredients | % |
|---|---|
| IYP (Spray dried) | 39.5 |
| Water | 59.3 |
| Caramel coloring | 1.2 |
| | 100.0 |

Preparation:
1. Weigh required amount of IYP and place in a Hobart mixing bowl.
2. Measure required amount of water and add the caramel coloring.
3. Set mixer on Speed 1.
4. Turn Hobart mixer on and add caramel colored water to the IYP in the Hobart mixing bowl very slowly, while mixing. Blend material well.
5. Extrude the blended material through a meat grinder, (e.g., Hobart attachment) and catch the extruded IYP in a dryer tray or pan. The extruded IYP can be cut into the desired length as it emerges from the extruder, or it can be collected as long strands and reduced to the desired size after drying.
6. Dry the extruded particles in a convection oven to a moisture content of about 10%. The dried, textured IYP is rehydrated for further use in food product applications by, 1) rehydrating in water (excess) at room temperature for 1 to 2 hours, or by, a) rehydrating in excess warm water (100 – 140 °F.) for 1 hour. The textured IYP will absorb water in the ratio of 1½ parts water to 1 part IYP.

Isolated Yeast Protein (IYP) can be used as a meat extender in beef patties. In the following example, 30 parts of hydrated IYP were combined with 70 parts of ground beef. This ratio conforms to the requirements set forth by the U.S.D.A. in FNS Notice 219 and in accordance with regulations governing the National School Lunch Program (Type A School Lunch). The combined PER attained by this ratio is 2.6.

The water absorption and fat binding properties of the IYP aid in reducing shrinkage (fat and water loss) on cooking and enhances the moisture and texture of the cooked patty.

BEEF PATTIES

| Ingredients | % | PER |
|---|---|---|
| Ground chuck beef | 70 | 2.8 |
| Hydrated, textured IYP (60% moisture) | 30 | 2.2 |
| | 100 | 2.6 (combined) |

Preparation:
1. Blend the ground chuck and the hydrated textured IYP together and shape into a patty form.
2. Fry the patty for 4 minutes on each side, in a skillet or on a griddle, at 350°F. Season or flavor as desired.
The patty may also be cooked on a grill to the desired doneness.

Isolated Yeast Protein (IYP) can be used as a meat extender in meat containing products, such as, Chili Con Carne. As shown in the following example, it can be used in combination with meat to comply with Type A School Lunch requirements as set forth by the U.S.D.A. in FNS Notice 219 and regulations covering the National School Lunch Program. In the example shown, 30 parts of hydrated, textured IYP are combined with 70 parts of meat, as specified in FNS 219, and providing a combined PER Of 2.6.

CHILI CON CARNE

| Ingredient | | % | PER |
|---|---|---|---|
| Tomatoes (and juice), canned | | 31.5 | |
| Red beans, canned | | 31.5 | |
| Cooked, ground chuck beef | (70 parts) | 17.5 | 2.8 |
| Hydrated, textured IYP, (60% moisture) | (30 parts) | 7.5 | 2.2 |
| Water | | 8.6 | |
| Chili Spice and Seasoning Mix | | 3.4 | |
| | | 100.0 | 2.6 (Combined) |

Preparation:
1. Blend hydrated, textured IYP with ground beef.
2. Cook in skillet or suitable pan until beef is browned.
3. Stir in spices and seasoning mix.
4. Add the remaining ingredients.
5. Bring to a boil.
6. Reduce heat; cover skillet; simmer for 10 minutes.

In the following example, IYP is used as a meat extender in a meat topping, such as that used on pizza. In this example, 50 percent of the ground beef was replaced by hydrated, textured IYP. Replacement at levels greater than or less than 50 percent can be made to suit product requirements.

MEAT TOPPING (PIZZA)

| Ingredient | % |
|---|---|
| Cooked, ground chuck beef | 50 |
| Hydrated, textured IYP, (60% moisture) | 50 |
| | 100 |

Preparation:
1. Blend hydrated, textured IYP with ground beef.
2. Cook in skillet or suitable pan until beef is browned.
3. Sprinkle cooked beef/hydrated IYP mixture onto pizza.
4. Bake pizza in oven at 450°F. until properly baked.

Isolated Yeast Protein (IYP) can be incorporated into a cereal based product, such as, Sugar Cookies to produce a protein fortified, nutritious cookie. In addition to added nutrition, the water absorbing and fat binding properties of IYP imparts improved texture and eating qualities to the baked cookie.

SUGAR COOKIES

| Ingredients | % |
|---|---|
| Flour, All Purpose | 22.5 |
| Isolated Yeast Protein (IYP) | 8.0 |
| Oleomargarine | 24.0 |
| Granulated sugar | 19.6 |
| Brown sugar | 13.1 |
| Whole egg | 10.9 |
| Salt | 0.9 |
| Vanilla | 0.6 |
| Baking soda | 0.4 |
| | 100.0 |

Preparation:
1. Cream the oleomargarine.
2. Add the granulated and brown sugar and beat until creamy.
3. Beat in the egg and the vanilla.
4. Sift all the dry ingredients together and stir into the above mixture.
5. Using a teaspoon, drop the batter onto a greased cookie sheet. Bake the cookies for 8 minutes at 375°F.

Isolated Yeast Protein (IYP) can be used as a protein replacement for milk proteins (e.g. N.F.D.M., sodium caseinate) in dairy type drinks such as, Instant Breakfast mixes. In the following example, a dry mix was prepared, containing 1 part of IYP to 3 parts of N.F.D.M. To prepare the drink, 1 cup (8 oz.) of cold milk are added to the dry ingredients and stirred. At this level of incorporation, the protein from IYP comprises 22 percent of the total protein in the prepared drink.

VANILLA INSTANT BREAKFAST DRINK

| Dry Mix Ingredients | Grams |
|---|---|
| Instant N.F.D.M. | 16.5 |
| IYP | 5.5 |
| Granulated sugar | 12.5 |
| Glycerine | 0.2 |
| Carrageenan | 0.1 |
| Vanilla flavor | 0.08 |
| | 34.88 |

Preparation:
1. Blend the dry mix ingredients until a uniform mix is obtained.
2. Place the blended ingredients into a large glass.
3. Add 1 cup (8 oz.) of cold milk.
4. Stir well.

Isolated Yeast Protein (IYP) can be incorporated into confectionery products such as caramel, to provide a nutritious candy. To demonstrate this type of application for this purpose, IYP was blended into sweetened, condensed milk and then further blended into a commercial caramel candy which had been melted down. The protein fortified blend was then allowed to solidify into the original chewy caramel state. For commerical application, the IYP can be dispersed in sweetened condensed milk or blended with the dry ingredients and conventional caramel or candy making procedures followed.

PROTEIN FORTIFIED CARAMEL CANDY

| Ingredients | % |
|---|---|
| Caramel candy | 75.0 |
| Sweetened condensed milk | 18.3 |
| IYP | 6.7 |
| | 100.0 |

Preparation:
1. Melt the caramels in a double boiler, over boiling water.
2. Blend the IYP into the sweetened, condensed milk to form a uniform paste.
3. Blend the milk/IYP paste into the melted caramel.
4. Cook for 5 minutes in a double boiler, over boiling water.
5. Pour the cooked candy onto waxed paper or a greased candy slab.
6. Allow to solidify, cut into pieces when cool.

What is claimed is:

1. A protein concentrate isolated from yeast which protein concentrate contains on a dry solids basis from about 65% to about 85% protein, about 0.5% to 9% nucleic acid, about 7% to about 15% lipid, about 1% to about 5% ash, and about 5% to about 20% carbohydrate, said protein concentrate being essentially free from cell wall residue and insoluble in water and having a PER greater than about 1.0.

2. The protein concentrate of claim 1 having a crude fiber content of less than about 1%.

3. The protein concentrate of claim 1 including about 0.05% to about 0.20% calcium ion.

4. The protein concentrate of claim 1 having less than about 5% nucleic acid.

5. The protein concentrate of claim 1 having less than about 3% nucleic acid.

6. A process for producing a yeast protein product comprising the steps of:
   a. rupturing yeast cells containing nuclease,
   b. separating the soluble nucleic acid, nuclease, and protein from the insoluble cell wall debris,
   c. hydrolyzing the nucleic acid with the nuclease,
   d. insolubilizing the protein, and
   e. separating the insoluble protein fraction from the remaining solubles fraction containing the hydrolyzed nucleic acid.

7. The process of claim 6 wherein the yeast cells are ruptured by homogenization below about 50°C.

8. The process of claim 6 wherein the ruptured yeast cells are extracted at a pH above about 5.5 and a temperature below about 60°C. to place the nuclease, the nucleic acid, and the protein in the solubles fraction.

9. The process of claim 8 wherein the solubles fraction after separation of the cell wall debris is incubated at a pH of 4.5 to 8.5 for 15 to 120 minutes and a temperature of 40° to 65°C. to increase the nuclease activity and reduce the nucleic acid content.

10. The process of claim 9 wherein the temperature during the separation of the protein from the solubles fraction is at least above 60°C.

11. The process of claim 6 wherein $CaCl_2$ is added after hydrolyzing the nucleic acid prior to separating the protein fraction.

12. The process of claim 6 including the step of recovering an isolated yeast protein having a composition on a dry solids basis of about 65% to about 85% protein, about 0.5% to about 9% nucleic acid, about 7% to about 15% lipid, about 1% to about 5% ash, and about 5% to about 20% carbohydrate.

13. The process of claim 12 wherein the recovered product has a nucleic acid content of less than about 3%.

14. A process comprising the steps of:
   a. growing a food grade yeast containing endogenous nuclease on a nutrient media.
   b. harvesting and washing the yeast cells,
   c. rupturing the yeast cells at a temperature between 0° and about 50°C.,
   d. holding the ruptured cells at a pH between about 5.5 and about 11.0 and at a temperature not greater than about 60°C. for a time not greater than about 60 minutes,
   e. removing the yeast insolubles at a temperature not greater than about 60°C.
   f. incubating the yeast solubles at a temperature not greater than about 60°C. and at a pH between 5 and about 8 for a time sufficient to decrease the nucleic acid content of the harvested protein, and
   g. removing the yeast protein at a temperature between 0°C. and 100°C. at a pH between 4 and 10.

15. A process according to claim 14 in which the food grade yeast is selected from a strain of *Saccharomyces cerevisiae*, *Saccharomyces fragilis*, *Saccharomyces carlsbergensis*, *Candida utilis*, and *Saccharomyces elipsoideus*.

16. A process according to claim 14 in which the yeast cells are ruptured at a temperature falling between 0°C. and 10°C.

17. A process according to claim 14 in which the ruptured yeast cells are adjusted to pH 8.5 to pH 10.5.

18. A process according to claim 14 in which the ruptured yeast cells are adjusted to pH 9.5.

19. A process according to claim 14 in which the yeast solubles are incubated between pH 6 and pH 7 and a temperature of 45°C. and 55°C.

20. A process according to claim 14 in which calcium chloride is added after the incubation of the yeast solubles and before the removal of the protein.

21. A process according to claim 20 in which the calcium chloride addition amounts to 0.1 and 1.0% of the weight of the solids present.

22. A process according to claim 20 in which the calcium chloride addition amounts to 0.2 to 0.4% of the weight of the solids present.

23. A process according to claim 20 in which the yeast protein is concentrated and deflavored by treatment in vacuo.

24. A process according to claim 14 in which the yeast protein is removed at a temperature between 50°C. and 85°C.

25. A process according to claim 14 in which the yeast protein is concentrated and deflavored by treatment in vacuo.

* * * * *